United States Patent [19]

Najjar et al.

[11] Patent Number: 4,657,698

[45] Date of Patent: Apr. 14, 1987

[54] PARTIAL OXIDATION PROCESS

[75] Inventors: Mitri S. Najjar, Hopewell Junction, N.Y.; Michael W. Becker, Long Beach, Calif.; Arnulf Muan, State College, Pa.

[73] Assignee: Texaco Inc., White Plains, N.Y.

[21] Appl. No.: 803,470

[22] Filed: Dec. 2, 1985

[51] Int. Cl.$^4$ ................................................ C01B 3/36
[52] U.S. Cl. ...................................... 252/373; 48/215
[58] Field of Search ........................... 252/373; 48/215

[56] References Cited

U.S. PATENT DOCUMENTS

| 1,799,885 | 4/1931 | Chavanne . | |
| 2,644,745 | 7/1953 | Hemminger | 48/203 |
| 3,607,157 | 9/1971 | Schlinger | 48/206 |
| 4,081,253 | 3/1978 | Marion | 252/373 |

Primary Examiner—Howard T. Mars
Attorney, Agent, or Firm—Robert A. Kulason; James J. O'Loughlin; Albert Brent

[57] ABSTRACT

An ash fusion temperature reducing agent comprising a mixture of about 70–97 wt. % of an iron compound and the remainder comprising a silicon compound is mixed with an ash-containing fuel comprising liquid hydrocarbonaceous material and/or petroleum coke. The comminuted mixture is reacted in a free-flow partial oxidation reaction zone with a free-oxygen containing gas in the presence of a temperature moderator to produce a hot raw effluent gas stream comprising $H_2+CO$ along with molten ash having a reduced initial deformation temperature. The weight ratio of ash fusion temperature reducing agent to ash in said ash-containing fuel is in the range of about 0.5 to 10, and the weight ratio of iron oxide to $SiO_2$ in said molten ash is about 1.5, or more. The molten ash is then separated from the hot raw effluent gas stream. In another embodiment, the comminuted ash fusion temperature reducing agent is disseminated into an ash-containing heavy liquid hydrocarbonaceous material and the mixture is then coked to produce petroleum coke containing dispersed therein said ash fusion temperature reducing agent. The petroleum coke entrained in a liquid or gaseous carrier is then introduced into the partial oxidation reaction zone as at least a portion of the feedstock. The molten ash is readily separated from the effluent stream of raw synthesis gas. The gas generator may be operated at a lower temperature thereby extending the life of the refractory lined reaction zone.

24 Claims, No Drawings

PARTIAL OXIDATION PROCESS

FIELD OF THE INVENTION

This invention relates to the partial oxidation of ash-containing liquid hydrocarbonaceous materials, ash-containing petroleum coke, or both to produce gaseous mixtures comprising $H_2+CO$. More particularly it pertains to the partial oxidation of ash-containing fuel comprising a liquid hydrocarbonaceous material, petroleum coke, or both to produce synthesis gas along with molten petroleum coke ash having a reduced ash fusion temperature.

BACKGROUND OF THE INVENTION

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominately vanadium, nickel and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of feed crude. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke. For example, water slurries of petroleum coke are reacted by partial oxidation in coassigned U.S. Pat. No. 3,607,157. Gasification is often cited as a convenient means of coke disposition. The decision to use gasification as a coke disposal means is generally based on economics. The expected rise in energy costs and legislation (primarily Canadian) requiring total use of feed crude should bring about a greater utilization of petroleum coke feeds to the partial oxidation gas generator.

Previous gasification runs with delayed coke gave rise to some unexpected operating problems. The ash, which normally melts and is discharged from the gasifier as a slag, was not melting completely and being discharged from the gasifier as a slag, but was building up on the walls of the refractory. The use of fluxing additives normally used for coal operations did not alleviate the problem. By the subject invention, the ash from the liquid hydrocarbonaceous fuel and/or solid carbonaceous fuel is combined with an ash fusion temperature reducing agent and the total ash produced from this combination of materials is easily removed from the partial oxidation reaction zone as molten slag at a lower temperature.

SUMMARY OF THE INVENTION

In accordance with the invention there is provided a process for the production of gaseous mixtures comprising $H_2+CO$ comprising: (1) mixing together (i) an ash fusion temperature reducing agent comprising a comminuted mixture of at least 70.0 wt. %, such as about 70–97 wt. %, and preferably 85–90 wt. % of an iron compound, and the remainder of said agent comprising a silicon compound, with (ii) an ash-containing fuel comprising a liquid hydrocarbonaceous material and/or petroleum coke; wherein the particle size of said mixture is preferably such that substantially all of the material passes through a sieve of the size in the range of ASTM E11 Standard Sieve Designation 425 $\mu m$ (microns) to 38 $\mu m$ (microns), or below, and the weight ratio of said ash fushion temperature reducing agent to ash is said ash-containing fuel is in the range of about 0.5–10; (2) reacting said mixture from (1) at a temperature in the range of about 2100° F. to 2700° F. and a pressure in the range of about 1 to 200 atmospheres in a free-flow partial oxidation reaction zone with a free oxygen containing gas in the presence of a temperature moderator to produce a hot raw effluent gas stream comprising $H_2+CO$ along with molten ash having a reduced ash fusion temperature, and wherein the weight ratio of an iron oxide to $SiO_2$ in said molten ash is about 1.5 or more; and (3) separating said molten ash from said hot raw effluent gas stream. In another embodiment of the invention, the comminuted ash fusion temperature reducing agent is mixed with an ash-containing heavy liquid hydrocarbonaceous material and coked. The resulting ash-containing petroleum coke containing dispersed throughout said ash fusion temperature reducing agent is then introduced into the partial oxidation reaction zone in (2) above. By the subject process, the initial deformation temperature for the ash derived from the partial oxidation of the ash-containing liquid hydrocarbonaceous material and/or ash-containing petroleum coke may be reduced in the range of about 100° C. to 600° F. Partial oxidation gas generators may now be run in the slagging mode at lower temperatures. The life of the refractory lining of the reaction zone is thereby extended at a great cost savings.

DESCRIPTION OF THE INVENTION

Closer study of the ash derived from the partial oxidation of liquid hydrocarbonaceous fuels and/or petroleum coke shows that they are largely composed of oxide and sulfide compounds of vanadium, nickel, iron, along with some normally occurring mineral matter species similar to that found in coal mineral matter. The metals present in the ash provide a system that is significantly different from that occurring in coal. A further factor is that the total ash content of the petroleum coke may only be about one half to 5 weight percent, whereas coal typically contains 10-20 weight percent ash. The comparatively low ash concentration in petroleum coke apparently is the reason that the ash removal problem is only noticed after prolonged gasifier runs. The chance for effective ash/additive mixing that is necessary to achieve ash fusion temperature modification is therefore greatly reduced. Moreover, it is theorized that in the liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix. This invention provides an improved ash fusion temperature reducing agent. Further, a means of introducing this agent into the system to give maximum effectiveness is provided.

By definition, the term ash-containing liquid hydrocarbonaceous material or fuel is a petroleum or coal derived fuel selected from the group consisting of virgin crude, reduced crude, vacuum tower bottoms or feeds, residual fuel oil, decanted oil from a catalytic cracker, heavy fuel oil slurry, heavy gas oils, asphalt, tar sands bitumen, shale oil, coal derived oil, and mixtures thereof.

A preferred embodiment of the subject invention involves mixing the improved comminuted ash fusion temperature reducing agent with ash-containing liquid hydrocarbonaceous fuel, or comminuted ash-containing petroleum coke, or both and introducing the mixture into the partial oxidation gasifier. In another embodiment the comminuted ash fusion temperature reducing agent is mixed with the liquid hydrocarbonaceous material and first fed into a coker. By this means, the finely ground agent may be intimately mixed throughout the petroleum coke product. The petroleum coke contains uniformly dispersed therein sufficient ash fusion temperature reducing agent to provide a weight ratio of ash fusion temperature reducing agent to the ash in the ash-containing fuel in the range of about 0.5 to 10.0. The preferable particle size of the mixture of comminuted ash fusion temperature modifying agent, the comminuted petroleum coke and mixtures thereof is such that substantially all e.g. about 95 wt. % or more of the material passes through a sieve of the size in the range of ASTM E-11 Standard Sieve Designation about 425 $\mu$m to 38 $\mu$m, or below. In another embodiment, the ash-containing petroleum coke is ground together with the ash fusion temperature reducing agent. Intimate mixing of the materials is thereby achieved, and the particle sizes of each material are substantially the same. The ground mixture is then mixed with water or a liquid hydrocarbonaceous material or both to produce a pumpable slurry. Alternatively, the solid materials may be wet ground with the liquid slurry medium. This slurry is then introduced into a partial oxidation gasifier.

The mixture of ash fusion reducing agent and ash-containing fuel is introduced into the free-flow partial oxidation zone and reacted at a temperature in the range of about 2100° F. to 2700° F. and a pressure in the range of about 1 to 200 atmospheres with a free-oxygen containing gas in the presence of a temperture moderator to produce a hot raw effluent gas stream comprising $H_2+CO$ e.g. synthesis gas along with molten ash having a reduced initial deformation temperature in comparison with that of the molten ash produced by the partial oxidation of the ash-containing fuel without being mixed with ash-fusion temperature reducing agent. Preferably, the comminuted mixture of ash fusion reducing agent and ash-containing fuel is introduced into the gasifier as a pumpable slurry including water or liquid hydrocarbonaceous fluid, or mixtures thereof. The solids content of the slurry is in the range of about 50-68 weight percent. Alternatively, the mixture may be entrained in a gaseous transport medium. The gaseous transport medium may be selected from the group consisting of steam, $CO_2$, $N_2$, free-oxygen containing gas, and recycle synthesis gas.

In the embodiment where the ash fusion temperature reducing agent is mixed with the liquid hydrocarbonaceous material and fed into a coker the actual operation can be accomplished for example by mixing the agent into the ash-containing petroleum liquid feed to the vacuum distillation tower, which normally precedes the coker unit. In either unit operation (coking or distillation), the agent should predominately stay behind in the desired bottoms stream. In other words, there should be little, if any, carry over of agent with the lighter products. A possible advantage for mixing the agent into the vacuum tower feedstream in preference to the bottoms stream (i.e. coker feed) is that the feed to the vacuum tower is significantly less viscous than the bottoms from the vacuum tower. A more thorough mixing may be thereby effected.

In one embodiment, a mixture of high boiling liquid petroleum i.e. liquid hydrocarbonaceous fuel and comminuted coke ash fusion temperature reducing agent at a temperature in the range of about 650° F. to 930° F. is introduced into a delayed coking zone, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke is removed from the bottom of said delayed coking zone. Alternatively, the mixture of high boiling liquid petroleum and comminuted coke ash fusion temperature reducing agent at a temperature in the range of about 550° F. to 750° F. may be introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

By definition, ash from liquid hydrocarbonaceous material or petroleum coke ash comprises mostly the oxides and possibly the sulfides of Ni, V, Fe, Al and Ca along with the oxides of Si, and a minor amount of the oxides selected from the group consisting of Ti, Cr, and mixtures thereof. While the metal concentrations in the liquid hydrocarbonaceous material may comprise Ni 0.5 to 610 ppm (parts per million), V 2.0–1500 ppm, Fe 0.5 to 750 ppm, along with Si, Al and Ca 0.5 to 750 ppm each; the metal concentrations in the petroleum coke product may comprise Ni 2.0 to 3100 ppm, V 8.0 to 7400 ppm, Fe 2.0 to 380 ppm and Si, Al and Ca 2.0 ppm or more. For example, the silicon content of petroleum coke made from syncrude derived from heavy oil sands may be greater than 7,000 ppm.

Another aspect of this invention is that the ash fusion modifying agent involved may be selected on the basis of serendipitous catalytic properties in addition to their primary function of ash fusion modification. They may act to produce more and/or better quality light products from the coker operation. They may also aid in the gasification reactions either by increasing the reaction rate and thus the throughput capacity of the gasifier or by increasing the conversion of the soot and thus the overall efficiency of the process. However, this invention does not depend on the catalytic properties of the agent.

It was unexpectedly found that a preferred ash fusion temperature reducing agent for mixing with the ash-containing fuel comprising liquid hydrocarbonaceous material and/or petroleum coke comprises a comminuted iron compound, preferably iron oxide in admixture with a comminuted silicon compound, preferably $SiO_2$. The iron compound may be selected from the group consisting of oxides, sulfates, carbonates, cyanides, chlorides, nitrates, and mixtures thereof. In another embodiment, the iron compound is a water soluble iron salt. In still another ambodiment the iron compound is a ferro or ferri organic compound selected from the group consisting of naphthenates, oxalates, acetates, citrates, benzoates, oleates, tartrates, and mixtures thereof. While any oxide of iron may be used, FeO is preferred. The iron compound may be selected from the group consisting of pure iron oxide, industrial waste products rich in iron materials, and mixtures thereof. For example, industrial waste products rich in iron materials include mill scale and scrap iron metal. The silicon compounds may be selected from the group consisting of silica, quartz, volcanic ash, silica-containing metal ores, and mixtures thereof. Further, the iron and silicon compounds in said ash fusion temperature reducing agent may be selected from the group consisting of iron-containing ore, iron and silicon-containing ore, and mixtures thereof. For example, the iron-containing ore may be micacious hematite, and said iron and silicon containing ore may be hematite.

Thus, the comminuted ash fusion temperature reducing mixture principally comprises at least 70.0 wt. %, such as about 70–97 wt. %, and preferably about 85–90 wt. % of an iron compound, and the remainder of the mixture comprises a silicon compound. The particle size of said coke ash fusion temperature mixture is such that substantially all e.g. about 95 weight percent or more of the material passes through a sieve of the size in the range of ASTM E-11 Standard Sieve Designation 425 $\mu m$ (microns) to 38 $\mu m$ (microns), or below.

The weight ratio of ash fusion temperature reducing agent to ash in the ash-containing fuel comprising liquid hydrocarbonaceous material and/or petroleum coke is in the range of about 0.5 to 10, such as about 1 to 3. In the foresaid ratio, the ash-containing fuel to be analyzed for ash is ashed under standard conditions and ignited to constant weight e.g. American Society For Testing and Materials (ASTM) D482 and D3686. The weight ratio of iron oxide to $SiO_2$ in the molten ash from the partial oxidation gasifier is about 1.5 or more, such as at least 1.5, and preferably in the range of about 1.5–4.0.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures will produce the same gasification problems as discussed for coke. Thus, the invention of introducing an ash fusion modifying agent as part of the petroleum processing prior to gasification should, depending on the specific process, produce a gasified feed that will be free of the gasification problems mentioned above. Most of these processes employ vacuum distillation as pretreatment. Accordingly, as described above, the ash fusion temperature reducing agent may be mixed into the vacuum distillation feed. The agent then will emerge from the distillation in the bottoms stream. In turn the bottoms stream is the feed stream for the upgrading process. This incorporation of the agent should not adversely affect these processes, and the agent should ultimately emerge with the residue stream from each respective process. In all these processes, this residue stream should be suitable for gasification by partial oxidation.

The ash-containing fuel and ash fusion temperature reducing agent are reacted with a free-oxygen containing gas e.g. air, oxygen-enriched air, substantially pure oxygen, in the presence of a temperature moderator e.g. $H_2$, $CO_2$, $N_2$, in the refractory lined partial oxidation synthesis gas generation zone at an autogenous temperature in the range of about 2100° F. to 2700° F., such as about 2150° F. to 2400° F., and a pressure in the range of about 1 to 200 atmospheres, such as about 6 to 60 atmospheres. The molten ash e.g. slag droplets are readily separated from the hot effluent gas stream leaving the reaction zone by gravity or by quenching and/or scrubbing the gas stream with water or other gas scrubbing medium. By this means, synthesis gas substantially comprising in mole % dry basis $H_2$ 25 to 45, CO 20 to 50, $CO_2$ 5 to 35, $CH_4$ 0.06 to 8.0, and $CO_2+H_2S$ 0.1 to 2.0 may be produced in a free-flow partial oxidation reaction zone, such as that shown and described in coassigned U.S. Pat. No. 3,607,157, which is incorporated herein by reference. The molten ash entrained in the hot raw effluent gas stream comprising $H_2+CO$ has an initial ash deformation temperature in the range of about 2100° F. to 2600° F., such as about 2150° F. to 2400° F. This is a reduction in the range of about 100° F. to 600° F. in comparison with the initial deformation temperature of the molten ash produced by the partial oxidation of the ash-containing fuel without admixture with ash-fusion temperature reducing agent.

Advantages of the present invention are illustrated by the following specific examples. These examples are set forth for purpose of illustration and should not be construed as limiting the invention.

EXAMPLE I

Run No. 1—The initial deformation temperature of ash produced by the partial oxidation of aqueous slurries of petroleum coke and referred to herein as "coke-ash from the gasifier" was determined to be greater than 2700° F. when tested according to ASTM Test Method D-1857. The petroleum coke feed to the partial oxidation gas generator was derived from the delayed coking of Alaskan heavy crude. The particle size of the ash-containing petroleum coke feed to the gas generator was such that substantially all of the material passes through a sieve of the size in the range of ASTM E-11 Standard Sieve Designation 212 $\mu$m to 38 $\mu$m, or below. The ash content of the petroleum coke feed was 0.4 wt. %.

Run No. 2—Elemental analyses for typical additive components comprising iron and silicon compounds which may be combined together to produce the subject ash fusion temperature reducing agent is shown in Table I below.

TABLE I

| Additive Components | Elemental Analysis - Wt. % | | | |
|---|---|---|---|---|
| | Fe | Ca | Si | Al |
| 1-Millscale | 77.2 | 0.2 | 0.9 | 0.8 |
| 2-Hematite (Micacous) | 62.0 | — | — | 1.5 |
| 3-Hematite | 20.4 | — | 28.0 | 0.5 |

The additive components shown in column 1 of Table I make up the ash fusion temperature reducing agent and are combined together with the coke ash from the gasifier in the manner shown in Column 1 of Table II below. Three parts by weight of the ash fusion temperature reducing agent were mixed with one part by weight of the coke ash from the gasifier and tested in accordance with ASTM Test Medthod D-1857 for the initial deformation temperature, softening temperature, and fluid temperature. The results are reported in columns 2-4 of Table II and show that the initial deformation temperature of the coke ash from the gasifier e.g. greater than 2700° F. is reduced by at least 480° F. through the addition of the ash-fusion temperature reducing agent comprising supplemental iron and silicon materials during the partial oxidation of the ash-containing fuel.

TABLE II

| REDUCTION OF PETROLEUM COKE ASH FUSION TEMPERATURE | | | |
|---|---|---|---|
| | Ash Fusion Temperature, °F. | | |
| Material Composition | Initial Deformation | Softening | Fluid |
| Coke Ash From Gasifier | 2700+ | | |
| (50.0 wt. % Hematite + 50.0 wt. % Micacous Hematite) + Coke Ash From Gasifier | 2012 | 2040 | 2220 |
| (80.0 wt. % Millscale + 20.0 wt. % SiO$_2$) + Coke Ash From Gasifier | 2087 | 2098 | 2133 |
| (70.0 wt. % FeO + 30.0 wt. % SiO$_2$) + Coke Ash From Gasifier | 2220 | 2321 | 2430 |

Accordingly, when the subject ash fusion temperature reducing agents are introduced into a partial oxidation gas generator in admixture with the ash-containing coke feed, gaseous mixtures comprising H$_2$+CO and containing molten ash having a reduced ash fusion temperature are produced. The gas generator may now be run in the slagging mode at lower temperatures. The subject ash fusion temperature reducing agent has a minimal interaction with the liner during shut down where the partial pressure of oxygen is high. The life of the refractory lining of the reaction zone is thereby extended at a substantial cost savings.

Although modifications and variations of the invention may be made without departing from the spirit and scope thereof, only such limitations should be imposed as are indicated in the appended claims.

We claim:

1. A process for the production of gaseous mixtures comprising H$_2$+CO comprising:
   (1) mixing together (i) an ash fusion temperature reducing agent comprising a comminuted mixture of about 70-97 wt. % of an iron compound, and the remainder of said agent comprising a silicon compound, with (ii) an ash-containing fuel comprising a liquid hydrocarbonaceous material and/or petroleum coke; wherein said ash-containing fuel contains sulfur and the ash in said ash-containing fuel substantially comprises the oxides of Ni, V, Fe, Al, Ca and Si, and wherein the weight ratio of said ash fusion temperature reducing agent to the ash in said ash-containing fuel is in the range of about 0.5 to 10;
   (2) reacting said mixture from (1) in a free-flow partial oxidation reaction zone with a free-oxygen containing gas in the presence of a temperature moderator to produce a hot raw effluent gas stream comprising H$_2$+CO along with molten ash having a reduced initial deformation temperature and wherein the weight ratio of iron oxide to SiO$_2$ in said molten ash is about 1.5, or more; and
   (3) separating said molten ash from said hot raw effluent gas stream.

2. The process of claim 1 wherein the iron compound in said ash fusion temperature reducing agent is selected from the group consisting of oxides, sulfates, carbonates, cyanides, chlorides, nitrates, and mixtures thereof; and said silicon compounds are oxides.

3. The process of claim 1 wherein the mixture of ash fusion reducing agent and ash-containing fuel from (1) is introduced into the free-flow partial oxidation zone in (2) either as a pumpable slurry including water or liquid hydrocarbonaceous fluid or mixtures thereof, or said mixture of fuel and agent may be entrained in a gaseous transport medium.

4. The process of claim 1 wherein said ash-containing liquid hydrocarbonaceous material is selected from the group consisting of virgin crude, reduced crude, residual fuel oil, decanted oil from a catalytic cracker, heavy fuel oil slurry, heavy gas oils, asphalt, tar sands bitumen, shale oil, coal derived oil, and mixtures thereof.

5. The process of claim 1 wherein said iron compound is a water soluble iron salt.

6. The process of claim 1 wherein said iron compound is a ferro or ferri organic compound selected from the group consisting of naphthenates, oxalates, acetates, citrates, benzoates, oleates, tartrates, and mixtures thereof.

7. The process of claim 1 wherein the iron compound in said ash fusion temperature reducing agent is selected from the group consisting of pure iron oxide, industrial waste products rich in iron materials, and mixtures thereof.

8. The process of claim 7 wherein said industrial waste products rich in iron materials is mill scale or scrap metal.

9. The process of claim 1 wherein said iron and silicon compounds in ash fusion temperature reducing agent in (1) is selected from the group consisting of iron-containing ore, iron and silicon-containing ore, and mixtures thereof.

10. The process of claim 10 wherein said iron-containing ore is micacious hematite, and said iron and silicon containing ore is hematite.

11. The process of claim 1 wherein the silicon compound in (1) is selected from the group consisting of silica, quartz, volcanic ash, silica-containing metal ores, and mixtures thereof.

12. The process of claim 1 wherein the mixture of materials from (1) has a particle size such that substantially all of the material passes through a sieve of the size in the range of ASTM E-11 Standard Sieve Designation 425 $\mu$m to 38 $\mu$m, or below.

13. A process for the production of gaseous mixtures comprising $H_2+CO$ comprising:
(1) disseminating a comminuted petroleum coke ash fusion temperature reducing agent principally comprising a comminuted mixture of about 70–97 wt. % of an iron compound, and the remainder of said agent comprising a comminuted silicon compound into an ash-containing fuel comprising a heavy liquid hydrocarbonaceous material so that the weight ratio of said petroleum coke ash fusion temperature reducing agent to ash in said ash-containing fuel is in the range of about 0.5 to 10.0; wherein said ash-containing fuel contains sulfur and the ash in said ash-containing fuel substantially comprises the oxides of Ni, V, Fe, Al, Ca and Si;
(2) coking said mixture of petroleum coke ash fusion temperature reducing agent and ash-containing heavy liquid hydrocarbonaceous material from (1) to produce petroleum coke containing dispersed therein said petroleum coke ash fusion temperature reducing agent; and
(3) reacting said petroleum coke from (2) in a free-flow partial oxidation reaction zone with a free-oxygen containing gas in the presence of a temperature moderator to produce a hot raw effluent gas stream comprising $H_2+CO$ along with molten ash having a reduced initial deformation temperature, wherein the weight ratio of iron oxide to $SiO_2$ in said molten ash is in the range of abut 1.5 to 4.0.

14. The process of claim 13 wherein said petroleum coke ash fusion temperature reducing agent comprises about 70 to 97 wt. % of iron oxide and the remainder substantially comprises silicon oxide.

15. The process of claim 13, wherein said iron compound is a water soluble iron salt.

16. The process of claim 13, wherein said petroleum coke ash fusion temperature reducing agent has a particle size such that substantially all of the material passes through a sieve of the size in the range of ASTM E-11 Standard Sieve Designation 425 $\mu$m to 38 $\mu$m, or below.

17. The process of claim 13 wherein the weight ratio of said petroleum coke ash fusion temperature reducing agent in (1) to ash in said ash-containing fuel is in the range of about 1–3.

18. The process of claim 13 wherein said ash-containing heavy liquid hydrocarbonaceous fuel is a high boiling liquid petroleum feed to or the bottoms from a vacuum tower or a fractionator.

19. The process of claim 13 provided with the step of separating said molten ash from the hot raw effluent gas stream in (3).

20. The process of claim 13 wherein the petroleum coke from (2) is introduced into the free-flow partial oxidation zone in (3) as a pumpable slurry of petroleum coke in water, liquid hydrocarbonaceous fluid or mixtures thereof, or said mixture of fuel and agent may be entrained in a gaseous transport medium.

21. A process for the production of gaseous mixtures comprising $H_2+CO$ comprising:
(1) mixing together (i) a comminuted ash fusion temperature reducing agent having a particle size such that substantially all of the material passes through a sieve of the size in the range of ASTM E-11 Standard Sieve Designation 425 $\mu$m to 38 $\mu$m, or below and which principally comprises about 70 to 97 wt. % of iron oxide and the remainder of said agent comprising $SiO_2$, with (ii) an ash-containing fuel comprising a high boiling liquid petroleum taken from the bottom of a vacuum tower or a fractionator, or with an ash-containing petroleum liquid feed to said vacuum tower or fractionator; wherein the weight ratio of said ash fusion temperature reducing agent to the ash in said ash-containing fuel is in the range of abut 0.5 to 10.0, and wherein said ash-containing fuel contains sulfur and the ash in said ash-containing fuel substantially comprises the oxides of Ni, V, Fe, Al, Ca and Si;
(2) introducing the mixture of ash-containing high boiling liquid petroleum and comminuted petroleum coke ash fusion temperature reducing agent from (1) at an elevated temperature into a coking zone and removing therefrom petroleum coke containing uniformly dispersed therein petroleum coke ash fusion temperature reducing agent;
(3) reacting said petroleum coke from (2) in a free-flow partial oxidation reaction zone with a free-oxygen containing gas in the presence of a temperature moderator to produce a hot raw effluent gas stream comprising $H_2+CO$ along with molten ash having a reduced initial deformation temperature; and (4) separating said molten ash from said hot raw effluent gas stream.

22. The process of claim 21 where in (2) the mixture of ash-containing high boiling liquid petroleum and comminuted coke ash fusion temperature reducing agent at a temperature in the range of about 650° F. to 930° F. is introduced into a delayed coking zone where at a temperature in the range of about 800° F. to 895° F. and a pressure in the range of about 20 to 60 psig, uncondensed hydrocarbon effluent vapor and steam are removed overhead, and said petroleum coke is removed from the bottom.

23. The process of claim 21 where in (2) the mixture of ash-containing high boiling liquid petroleum and comminuted coke ash fusion temperature reducing agent at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead, and said petroleum coke is removed from the bottom.

24. The process of claim 21 wherein said molten petroleum coke ash in (3) has a weight ratio of iron oxide to $SiO_2$ in the range of about 1.5–4.0, and provided with the step of separating said molten ash from said hot effluent gas stream from (4) with a water or oil scrubbing medium.

* * * * *